United States Patent
Zalan et al.

(10) Patent No.: US 8,720,968 B2
(45) Date of Patent: May 13, 2014

(54) CHARGE PORT DOOR WITH ELECTROMAGNETIC LATCHING ASSEMBLY

(75) Inventors: Daryl Zalan, San Francisco, CA (US); Joshua Willard Ferguson, Alameda, CA (US); Troy Adam Nergaard, San Francisco, CA (US); Nicholas Robert Kalayjian, San Carlos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/482,900

(22) Filed: May 29, 2012

(65) Prior Publication Data
US 2013/0076059 A1 Mar. 28, 2013

Related U.S. Application Data (60) Provisional application No. 61/540,303, filed on Sep. 28, 2011, provisional application No. 61/540,441, filed on Sep. 28, 2011, provisional application No. 61/540,550, filed on Sep. 29, 2011.

(51) Int. Cl.
*B60J 9/00* (2006.01)
*E05C 19/16* (2006.01)

(52) U.S. Cl.
USPC ................. 296/97.22; 292/251.5

(58) Field of Classification Search
USPC ................. 296/97.22; 292/251.5
See application file for complete search history.

(56) References Cited

U.S. PATENT DOCUMENTS

| | | | |
|---|---|---|---|
| 2,606,772 A * | 8/1952 | Mead et al. ................. 280/853 |
| 4,792,165 A | 12/1988 | Nishimura | |
| 4,917,418 A | 4/1990 | Gokee | |
| 5,044,678 A | 9/1991 | Detweiler | |
| 5,072,986 A | 12/1991 | Tai et al. | |
| 5,536,173 A | 7/1996 | Fujitani et al. | |
| 5,556,284 A | 9/1996 | Itou et al. | |
| 5,577,920 A | 11/1996 | Itou et al. | |
| 5,637,977 A | 6/1997 | Saito et al. | |
| 5,664,811 A | 9/1997 | Martus et al. | |
| 5,699,685 A | 12/1997 | Jahrsetz et al. | |
| 5,802,894 A | 9/1998 | Jahrsetz et al. | |
| 5,816,643 A * | 10/1998 | Itou et al. ................. 296/97.22 |
| 5,836,638 A | 11/1998 | Slocum | |
| 6,234,557 B1 | 5/2001 | Bae | |
| 6,237,647 B1 | 5/2001 | Pong et al. | |
| 6,408,901 B2 | 6/2002 | Holloway et al. | |
| 6,458,000 B2 | 10/2002 | Shappell | |
| 6,609,738 B1 * | 8/2003 | Roth et al. ................. 292/251.5 |
| 6,739,633 B2 | 5/2004 | Holloway et al. | |
| 6,745,911 B1 | 6/2004 | Maestranzi | |

(Continued)

*Primary Examiner* — Dennis Pedder
(74) *Attorney, Agent, or Firm* — J. Richard Soderberg (57) ABSTRACT

A door latching system for the door covering the charge port of an electric vehicle, or for the door covering the fuel filler port of a conventional vehicle, is provided. The door latching system is comprised of a ferromagnetic member attached to an interior surface of the door, and a latching assembly integrated into the port housing, where the latching assembly includes an assembly case, an electromagnet, and a permanent magnet that maintains the door in a closed position when the electromagnet is not energized and releases the door when the electromagnet is energized. The latching assembly may include a magnetic flux sensor that monitors when the port door is open or closed. The magnetic flux sensor may be coupled to a system controller that performs a preset response when the magnetic flux sensor determines that the door is open.

20 Claims, 7 Drawing Sheets

(56) References Cited

U.S. PATENT DOCUMENTS

| | | |
|---|---|---|
| 6,761,194 B1 | 7/2004 | Blong |
| 6,834,688 B2 | 12/2004 | Ono et al. |
| 7,171,989 B2 | 2/2007 | Corless et al. |
| 7,390,222 B2 | 6/2008 | Ciancanelli et al. |
| 7,671,482 B2 | 3/2010 | Tighe |
| 7,967,361 B2* | 6/2011 | Scott et al. ............ 296/97.2 |
| 7,988,453 B2 | 8/2011 | Loo et al. |
| 8,000,856 B2 | 8/2011 | Larsen et al. |
| 8,025,526 B1 | 9/2011 | Tormey et al. |
| 8,094,017 B2* | 1/2012 | Hunt et al. ............ 340/542 |
| 8,215,684 B2* | 7/2012 | Whitens et al. ........ 292/251.5 |
| 8,360,117 B2 | 1/2013 | Hajiaghajani |
| 8,460,028 B2 | 6/2013 | Tormey et al. |
| 2009/0079225 A1 | 3/2009 | Katou |
| 2009/0236440 A1* | 9/2009 | Anderson et al. ........ 239/67 |
| 2009/0242291 A1 | 10/2009 | Sagawa et al. |
| 2010/0065147 A1 | 3/2010 | Gerard et al. |
| 2010/0230979 A1* | 9/2010 | Gries ................ 292/251.5 |
| 2010/0265033 A1 | 10/2010 | Cheung |
| 2011/0115239 A1 | 5/2011 | Imatomi et al. |
| 2011/0151693 A1 | 6/2011 | Loo et al. |
| 2011/0285165 A1* | 11/2011 | Baba et al. ........... 296/97.22 |
| 2013/0076059 A1 | 3/2013 | Zalan et al. |
| 2013/0078839 A1 | 3/2013 | Musk et al. |
| 2013/0078841 A1 | 3/2013 | Ferguson et al. |

* cited by examiner

CHARGE PORT DOOR WITH ELECTROMAGNETIC LATCHING ASSEMBLY

CROSS-REFERENCE TO RELATED APPLICATION

This application claims the benefit of the filing date of U.S. Provisional Patent Application Ser. Nos. 61/540,303, filed 28 Sep. 2011, 61/540,441, filed 28 Sep. 2011 and 61/540,550, filed 29 Sep. 2011, the disclosures of which are incorporated herein by reference for any and all purposes.

FIELD OF THE INVENTION

The present invention relates generally to vehicles and, more particularly, to the charge port of an electric vehicle.

BACKGROUND OF THE INVENTION

The charge port for plug-in hybrids and all-electric vehicles is typically externally mounted, thereby allowing easy access and the ability to lock the passenger compartment while the vehicle is being charged. A charge port door, similar to the fuel filler door on a conventional vehicle, is used to protect the charge port from the weather as well as possible tampering. In general, the same type of door latch and release assemblies are used for both charge port and fuel filler doors.

A variety of different mechanisms have been used to hold the door of a conventional vehicle in a closed position, regardless of whether the door is covering a fuel port or a charge port. Often the door is spring loaded toward an open position, thus causing the door to open, or at least partially open, when the latch is released. U.S. Pat. No. 4,917,418 discloses one type of latching mechanism in which a spring loaded latch is designed to engage a notch in the spring loaded door. The spring loaded latch can be pulled, thus releasing the door, using a remote release device mounted in the passenger cabin or trunk. The release device is coupled to the spring loaded latch via a cable.

U.S. Pat. No. 5,044,678 discloses an alternate release system for use with a spring loaded latch and a spring loaded door. As disclosed, the system uses a compact solenoid assembly, thus simplifying remote activation. The disclosed solenoid assembly is self-compensating in order to reduce the required armature travel distance and thus the size of the solenoid, thereby allowing a reduction in the size, weight and cost of the assembly.

In order to further reduce cost while retaining the style advantages of a flat hidden door with no visible finger opening, U.S. Pat. No. 5,836,638 discloses a fuel door assembly with a push-push lock that eliminates the need for either a solenoid or cable remote latching mechanism. The disclosed push-push lock has two positions; a first position that holds the door in a completely closed position and a second position that holds the door in a partially open position, thereby allowing the door edge to be grasped and manually opened.

U.S. Pat. No. 6,739,633 discloses an alternate fuel filler door actuator that utilizes a motor and gear train to move the door latch between the locked and unlocked positions. Although the primary actuation system is motorized, the use of a manual override cable to manually move the latch from the locked to unlocked positions is also described.

The present invention provides an alternate door latching system that is compact, low power and easily integrated with a door position sensor.

SUMMARY OF THE INVENTION

The present invention provides a door latching system for the door covering the charge port of an electric vehicle, or for the door covering the fuel filler port of a conventional vehicle (i.e., a vehicle with a combustion engine). The door latching system is comprised of a ferromagnetic member, e.g., a ferromagnetic metal or composite, attached to an interior surface of the door, and a latching assembly integrated into the port housing, where the latching assembly includes an assembly case, an electromagnet, and a permanent magnet. The latching assembly maintains the door in a closed position when the electromagnet is not energized and releases the door when the electromagnet is energized. A spring may be used to load the door towards an open position, so that when the electromagnet is energized and the latching assembly releases the door, the spring forces the door from the closed to the open position. The port housing may be integrated into the vehicle reflector and lamp assembly, for example by attaching a reflector to an exterior surface of the door and integrating the door reflector into the vehicle reflector and lamp assembly. A seal, e.g., a seal fabricated from a natural or synthetic rubber, may be attached to an interior surface of the door so that when the door is closed, the seal is compressed against a port inlet surface, thereby sealing the port from debris, moisture and other contaminants.

In at least one embodiment, the system further includes a switch that controls when the electromagnet is connected to a power source and energized. The switch may be mounted within the vehicle passenger cabin. The switch may be a soft button on a touch-screen display. The switch may be remotely and wirelessly activated.

In at least one embodiment, the latching assembly may further comprise a magnetic flux sensor (e.g., a reed switch or a Hall sensor) coupled to a sensor circuit, where the sensor circuit outputs a first control signal when the door is closed and the ferromagnetic member is adjacent to the latching assembly, and outputs a second control signal when the door is open and the ferromagnetic member is not adjacent to the latching assembly. In one configuration, the magnetic flux sensor is mounted within the ferromagnetic core of the electromagnet. A system controller may be coupled to the sensor circuit and configured to perform a preset response upon receipt of the second control signal (e.g., the door open control signal) from the sensor circuit. Preset responses include (i) activating a warning indicator (e.g., a warning light), (ii) activating a light in the access port, and (iii) transmitting a notification message via a notification subsystem coupled to the system controller.

A further understanding of the nature and advantages of the present invention may be realized by reference to the remaining portions of the specification and the drawings.

DESCRIPTION OF THE SPECIFIC EMBODIMENTS

Figure 1:
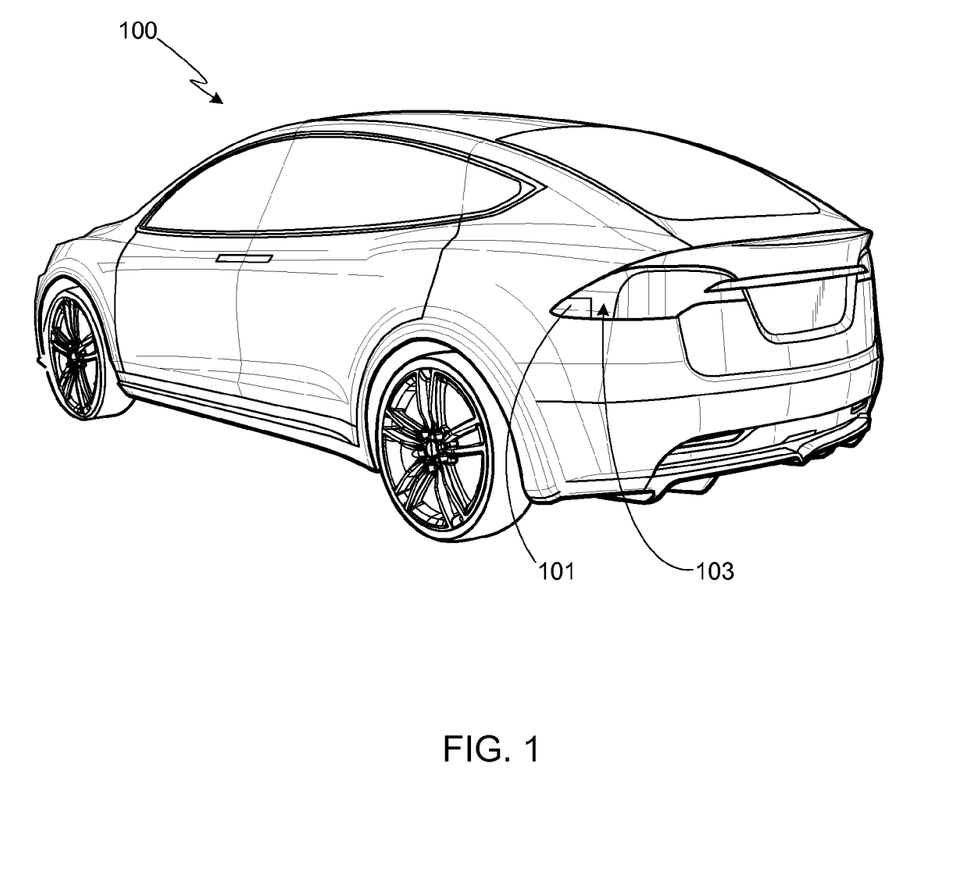
FIG. 1 illustrates the charge port access door of the invention integrated into the lamp assembly of an electric vehicle.
Figure 2:
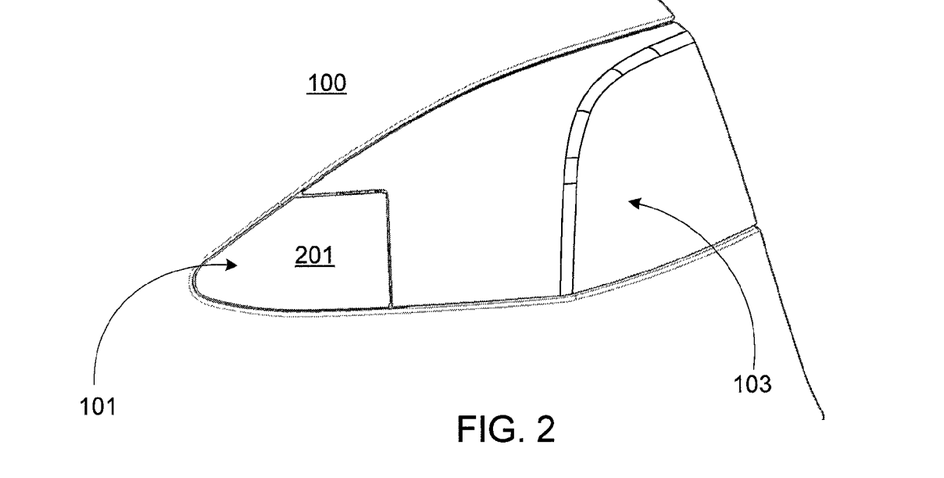
FIG. 2 provides an external side view of the lamp assembly of the vehicle shown in FIG. 1 with the charge port access door closed.
Figure 3:
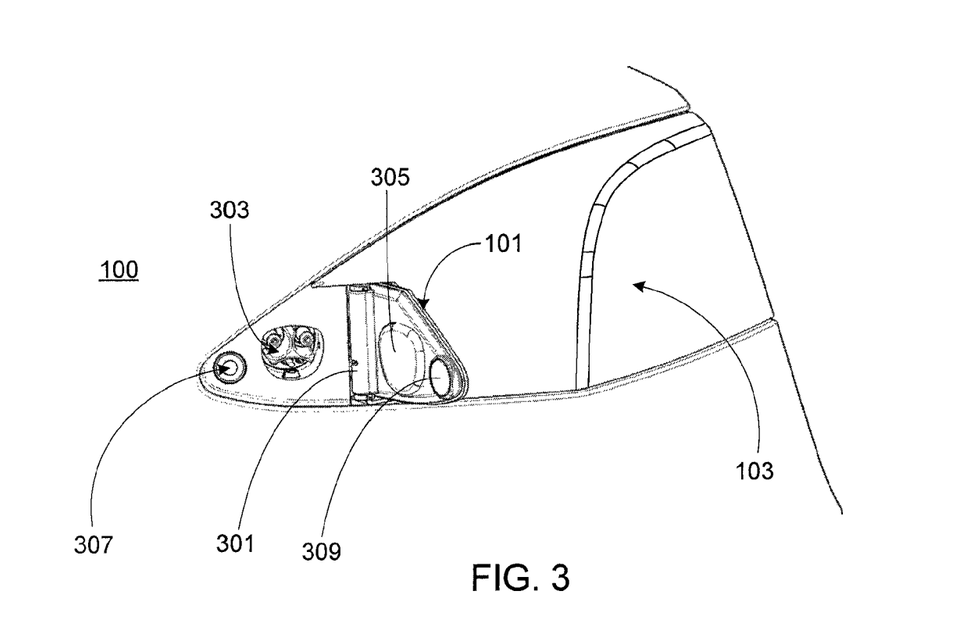
FIG. 3 provides an external side view of the lamp assembly of the vehicle shown in FIG. 1 with the charge port access door open.

FIGS. 1-3 illustrate a charge port door 101 integrated within a vehicle 100. In this exemplary embodiment, the charge port door is integrated into the rear vehicle lamp and reflector assembly 103 and utilizes the latching mechanism of the present invention. It should be understood, however, that the present invention is not limited to such a configuration and that the latching system of the invention is equally applicable to a charge port door mounted at another vehicle location, such as the front or rear fender panel, or another vehicle body member. Similarly, it will be appreciated that while the latching mechanism is illustrated with a charge port door (i.e., charge port door 101), it may also be used with a conventional fuel filler door.

FIGS. 2 and 3 provide external side views of the lamp assembly 103 of vehicle 100 and charge port door 101 with the door closed and opened, respectively. In this exemplary configuration, the exterior surface of charge port door 101 is covered with a reflector 201, thus allowing the charge port door to blend into the lamp and reflector assembly 103. Door 101 is preferably spring loaded, thus causing the door to at least partially open about hinge axis 301 when the latching mechanism is released. With door 101 open, charge port 303 is visible as is port seal 305. A portion 307 of the latching mechanism is located within the charge port assembly integrated into the vehicle while a secondary portion of the latching mechanism 309 is located on the complimentary surface of door 101.

Figure 4:
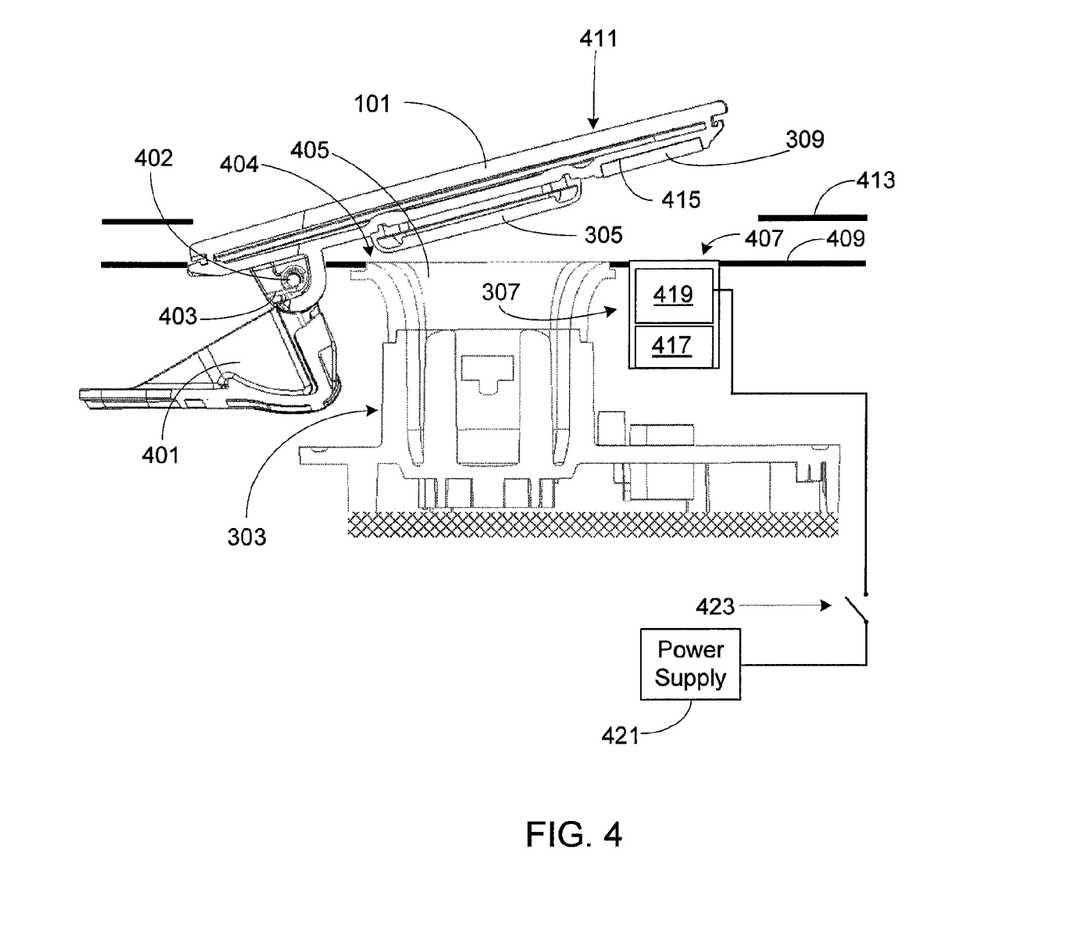
FIG. 4 provides a cross-sectional view of the charge port access door assembly with the door open.
Figure 5:
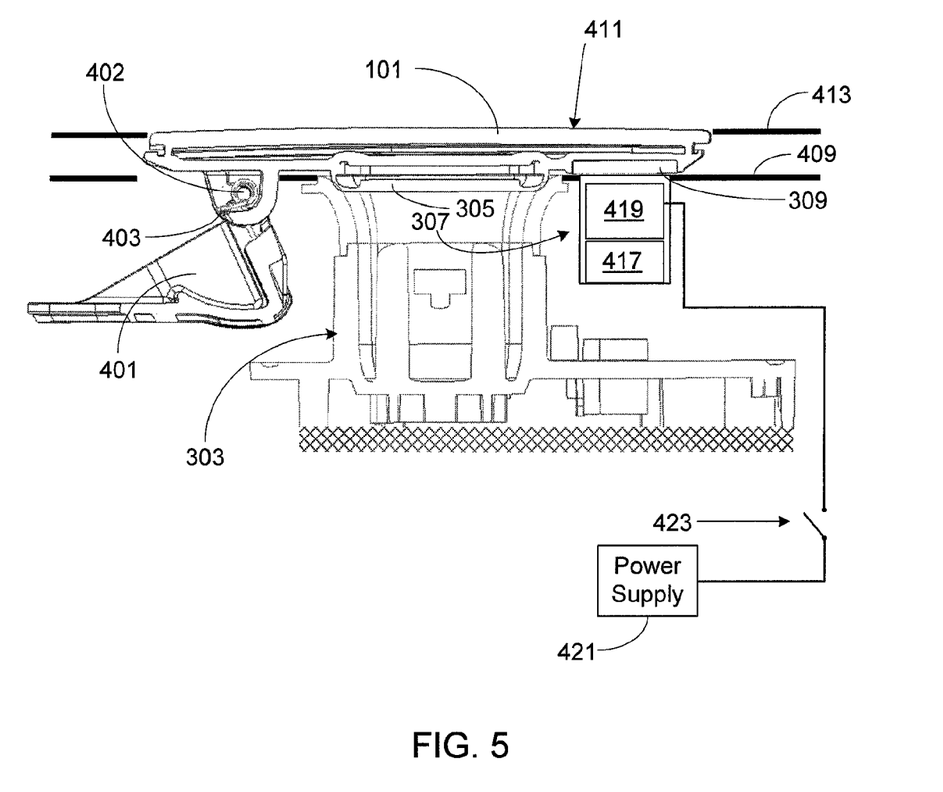
FIG. 5 provides a cross-sectional view of the charge port access door assembly with the door closed.

FIGS. 4 and 5 provide cross-sectional views of door 101, these views highlighting details of the latching mechanism as well as the overall assembly. Door 101 is coupled to a hinge 401 and designed to pivot about hinge axis 402. A spring 403 is also visible in this view, spring 403 designed to force the door into an open, or partially open, position upon release of the latching mechanism. In these figures a portion of charge port 303 is visible. Note that in this design preferably the outer edge 404 of the inlet surface 405 of charge port 303 as well as the outer surface 407 of latching assembly 307 are flush, or substantially flush, with surface 409 of the charge port assembly. Similarly, when door 101 is closed, preferably the outer surface 411 of door 101 is flush with the surrounding vehicle surface 413 which, in the exemplary embodiment, is the reflector and lamp assembly 103. In the illustrated embodiment, when door 101 is closed, seal 305 attached to the inner surface of door 101 is compressed against charge port inlet surface 405, thereby sealing the charge port from dust, moisture and other contaminants. In order to achieve the desired seal, preferably sealing member 305 is fabricated from an elastomeric material such as a natural or synthetic rubber (e.g., nitrile, nitrile butadiene, carborylated nitrile, hydrogenated nitrile, perfluoroelastomer, silicone, fluorosilicone, neoprene, ethylene propylene, polyurethane, butyl, etc.).

Figure 9:
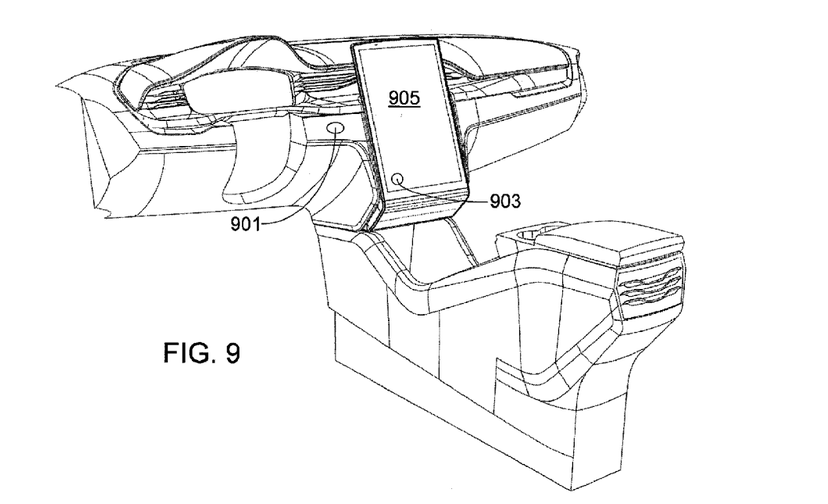
FIG. 9 illustrates a portion of a vehicle's passenger cabin, the illustrated portion including the vehicle dashboard.
Figure 10:
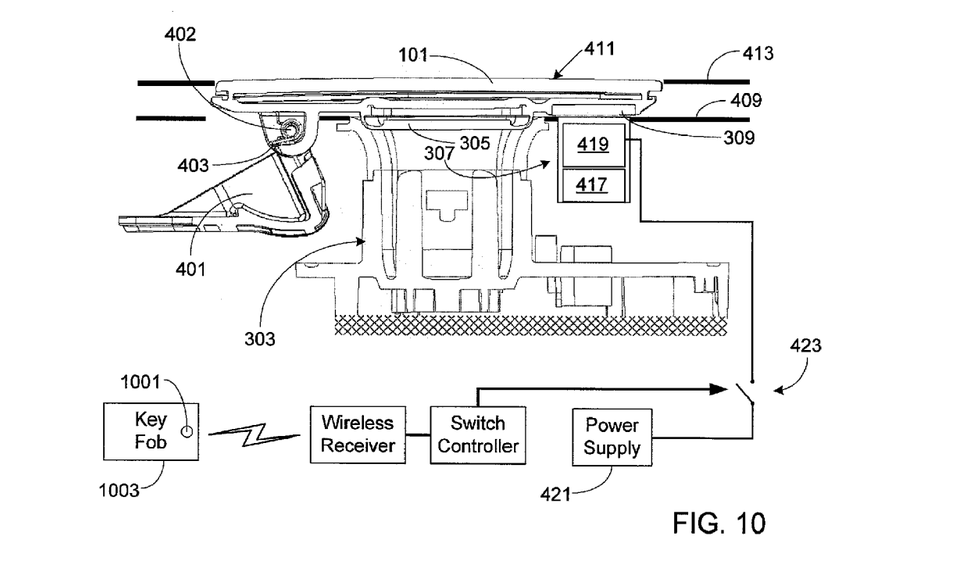
FIG. 10 illustrates a modification of the assembly shown in FIGS. 4-6.

Latch component 309 of the latching assembly is comprised of a disc or alternately shaped member that is fabricated from a ferromagnetic metal such as steel, iron, or nickel, or from a ferromagnetic composite such as a ferrite. Preferably member 309 is bonded or otherwise attached to the inner surface of door 101. In the exemplary configuration, ferromagnetic disc 309 is bonded within a recessed region 415 of the door, region 415 aiding in component alignment as well as providing a secure mounting location. The primary latching assembly 307 is comprised of two integrated components; a permanent magnet 417 and an electromagnet 419. Electromagnet 419 is coupled to a power source 421 via one or more switches 423. Preferably at least one switch 423 is located within the passenger cabin, either as a stand-alone switch 901 or as a part of a user interface, e.g., soft button 903 on touchscreen display 905 as shown in FIG. 9. In a preferred embodiment, switch 423 may be remotely and wirelessly activated, thus allowing the port door to be opened using a button 1001 on a key fob 1003 or using a proximity detection system (e.g., RFID) that may, for example, be integrated within the user's key fob.

Electromagnet 419 is mounted within assembly 307 such that when it is energized, the magnetic field generated by the electromagnet cancels, or at least substantially cancels, that of permanent magnet 417. In its normal state, switch 423 is open as shown and as such, electromagnet 419 is not energized. In this state electromagnetic 419 does not affect the magnetic field of permanent magnet 417 and the ferromagnetic member 309 mounted to door 101 is attracted to permanent magnet 417 mounted within the port assembly. Accordingly, if the user closes door 101 when switch 423 is open and therefore electromagnet 419 is not energized, the door will remain closed due to the magnetic attraction between permanent magnet 417 and ferromagnetic member 309. Once closed, if the user wishes to open the door, a momentary closing of switch 423 will energize electromagnet 419, thereby weakening, if not altogether canceling, the magnetic field of permanent magnet 417 and its effects on ferromagnetic element 309. This, in turn, allows the spring loaded door to open. It will be appreciated that in this configuration, except for the brief times in which the user energizes electromagnet 419 in order to open the door, the system does not draw power from the vehicle's batteries or any source.

Figure 6:
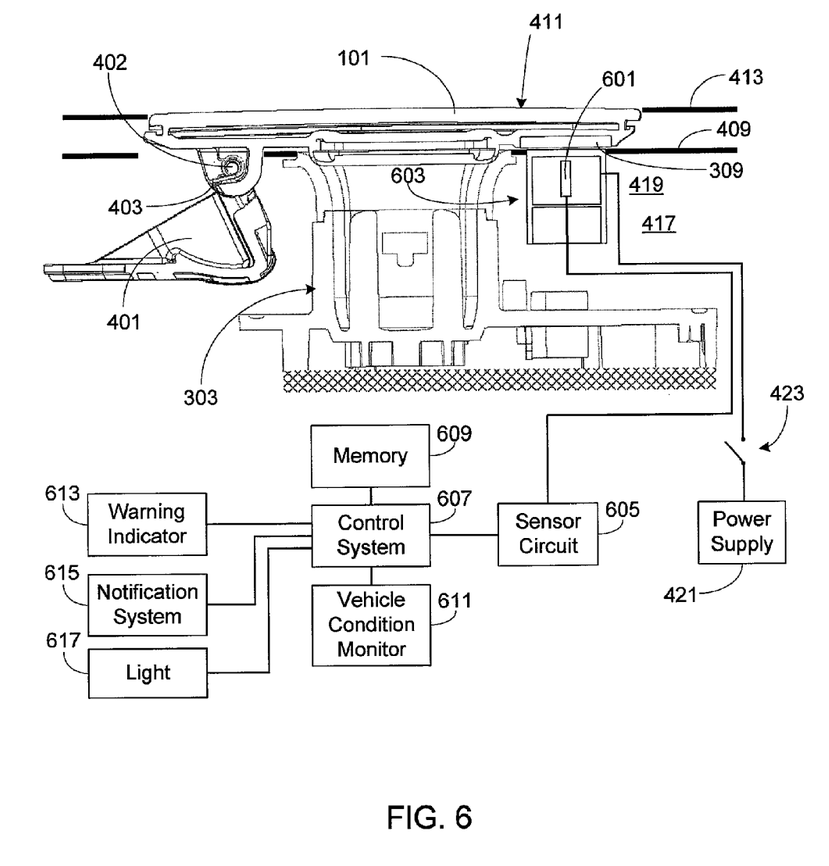
FIG. 6 illustrates a modification of the assembly shown in FIGS. 4 and 5.

FIG. 6 illustrates a modification of the embodiment described above in which a magnetic flux sensor 601 is integrated into the latching assembly, where the latching assembly includes permanent magnet 417 and electromagnet 419 as described above. Preferably the magnetic flux sensor is comprised of a reed switch, although other types of magnetic flux sensors such as a Hall sensor may also be used. Briefly, a reed switch (also commonly referred to as a reed relay) includes one or more pair of metal contacts, i.e., reeds, contained within a sealed container where the state of the contacts, i.e., open or closed, depends upon the magnetic field applied to the switch. A Hall sensor is a type of transducer that is commonly used to detect magnetic flux density, or changes in magnetic flux density, where the output voltage of the sensor varies with magnetic flux density. As both reed switches and Hall sensors are well known, a detailed description is not provided herein.

In the present system, the magnetic flux associated with latching assembly 603 varies significantly depending upon the relative positions of ferromagnetic member 309 and permanent magnet 417. In particular, the flux density varies significantly between the door closed state (shown in FIG. 5) where ferromagnetic member 309 is immediately adjacent to, or in contact with, the front face 407 of latching assembly 603, and the door open state (shown in FIGS. 4 and 6) where ferromagnetic member 309 is located at some distance from latching assembly 603.

Magnetic flux sensor 601 is coupled to a sensor circuit 605, circuit 605 outputting a control signal that depends upon the magnetic flux density at the latch assembly, and thus the state of door 101. The exact configuration of circuit 605 will clearly vary depending upon the nature of sensor 601. For example, assuming the use of a reed switch, circuit 605 may only be required to monitor whether the circuit that includes the reed switch is open or closed, e.g., whether the contacts in the reed switch are open or closed. Alternately, if a Hall sensor is used, circuit 605 will typically be required to supply a small voltage to the sensor and then monitor the output Hall voltage of the sensor. Given the desire to minimize circuit complexity and battery loads, and given the overall reliability and robustness of reed switches, the preferred embodiment of the invention uses a reed switch.

The control signal output by sensor circuit 605 is preferably coupled to a system controller 607 which determines the response to take, if any, based on the output of circuit 605. The response is preferably recorded in a preset set of instructions. Controller 607 may be a stand-alone controller or integrated into another vehicle control system, for example a vehicle management system. In addition to a control processor, controller 607 typically includes a memory 609 for storing the preset set of control instructions. Memory 609 may be comprised of flash memory, a solid state disk drive, a hard disk drive, or any other memory type or combination of memory types.

It will be appreciated that the output from sensor circuit 605 may be used in any of a variety of ways, depending upon the specifics of the vehicle into which the latching assembly 603 is integrated (e.g., electric versus combustion vehicle, luxury versus economy vehicle, etc.) as well as system design goals. Accordingly, while FIG. 6 and the corresponding text describes a number of uses and responses based on the output of sensor circuit 605, these are only meant to illustrate, not limit, the application of the invention.

In order to determine the appropriate response to the door open/door closed output of sensor circuit 605, preferably system controller 607 receives information from one or more vehicle condition monitors 611. Exemplary vehicle condition monitors 611 may monitor and report to controller 607 (i) whether the vehicle is on or off (i.e., ignition on/off or power switch on/off); (ii) whether the vehicle is in park or drive; (iii) whether the vehicle is stationary or moving; (iv) whether the vehicle is occupied (e.g., using seat sensors); (v) whether the doors are locked; (vi) whether a charging source is coupled to the charge port; etc. Depending upon the output from the vehicle condition monitor(s) 611, when the output from sensor circuit 605 indicates that the charge port door (or fuel filler door) is open, controller 607 may be programmed to activate a warning indicator 613 such as an indicator light mounted in an instrument cluster on the dashboard and/or a graphic/symbol displayed on a vehicle interface. Typically a warning light would only be activated if the vehicle is in an 'on' or active state. If the vehicle is not active and/or occupied, controller 607 may be programmed to transmit a notification message (e.g., notification text or pre-recorded message) via an on-board communication system utilizing cellular, internet, satellite or other network, the notification message notifying the owner or a third party that the charge port/fuel filler door has been opened, or that the status of the door has been changed (i.e., changed from open to closed or from closed to open). In at least one embodiment, when the sensor circuit 605 outputs a signal corresponding to a door open state, a light 617 within the charge port assembly (or within the fuel filler assembly) is activated, thus helping the user to couple a charger to the charge port (or a fuel line to the fuel filler port). An external vehicle courtesy light may also be activated in this situation.

Figure 7:
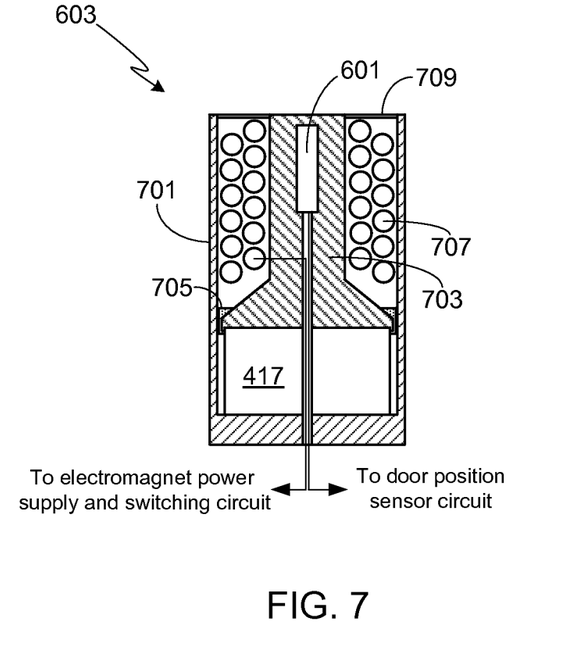
FIG. 7 provides a detailed cross-sectional view of the latching assembly shown in FIG. 6.
Figure 8:
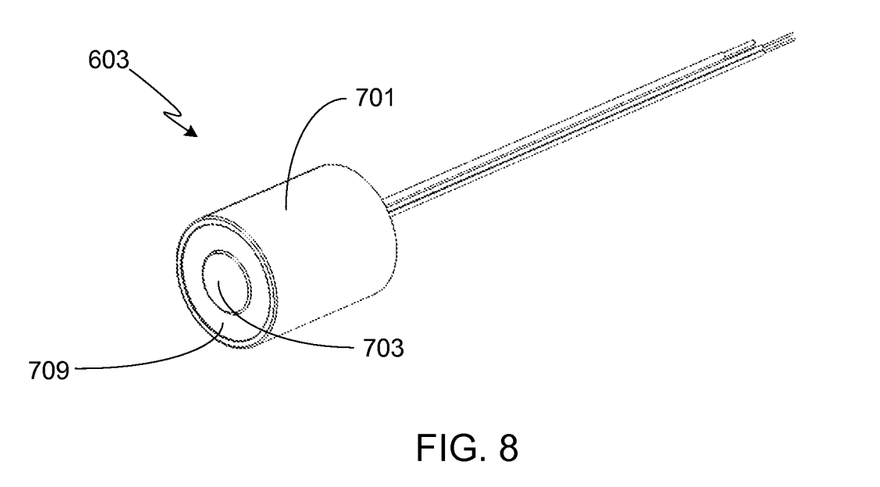
FIG. 8 provides a perspective view of the latching assembly shown in FIG. 7.

FIGS. 7 and 8 provide cross-sectional and perspective views, respectively, of a preferred embodiment of latch assembly 603. The assembly is housed within a case 701, preferably fabricated from a plastic material. Housed within the base section of case 701 is permanent magnet 417. On top of permanent magnet 417 is core 703 of electromagnet 419. Core 703 is fabricated from a ferromagnetic metal such as steel, iron, or nickel, or from a ferromagnetic composite such as a ferrite. Core 703 is preferably positioned within casing 701 using a spacer 705. In at least one embodiment, spacer 705 is fabricated from a plastic material. Wrapped around core 703 is a coil comprised of insulated wire windings 707. In the illustrated embodiment, an annulus capping member 709 seals the electromagnet in general, and the electromagnetic coil 707 in particular, within the assembly. The magnetic flux sensor 601 is preferably mounted within the core of the electromagnet, as shown.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A port door assembly of a vehicle, comprising:
 a housing integrated into a vehicle reflector and lamp assembly of said vehicle, said housing providing access to a vehicle port;
 a door coupled to said housing by a hinge, wherein in a closed position said door covers said vehicle port and in an open position said door provides access to said vehicle port;
 a door latching system, comprising:
 a ferromagnetic member attached to an interior surface of said door;
 a latching assembly integrated into said housing, wherein an exterior surface of said latching assembly contacts said ferromagnetic member when said door is in said closed position, wherein said latching assembly further comprises:
 a latching assembly case;
 an electromagnet mounted within said latching assembly case, the electromagnet forming the exterior surface of the latching assembly; and
 a permanent magnet mounted within said latching assembly case on an opposite side of the electromagnet relative to the ferromagnetic member, wherein said permanent magnet attracts said ferromagnetic member and said latching assembly maintains said door in said closed position when said electromagnet is not energized, and wherein said latching assembly releases said door when said electromagnet is energized.

2. The port door assembly of claim 1, further comprising a spring, wherein said spring loads said door towards said open position both when the door is moving toward the open position and when the door is in the closed position, and wherein when said electromagnet is energized and said latching assembly releases said door said spring forces said door from said closed position to said open position.

3. The port door assembly of claim 1, further comprising a reflector that covers an exterior surface of said door, wherein opening the door does not displace the lamp assembly, wherein said reflector integrates into said vehicle reflector and lamp assembly when said door is in said closed position.

4. The port door assembly of claim 1, wherein said ferromagnetic member is comprised of a material selected from the group consisting of ferromagnetic metals and ferromagnetic composites.

5. The port door assembly of claim 1, wherein said vehicle is an electric vehicle and said vehicle port further comprises a charge port.

6. The port door assembly of claim 5, further comprising a sealing member attached to said interior surface of said door, wherein said sealing member is compressed against a charge port inlet surface when said door is in said closed position.

7. The port door assembly of claim 6, wherein said sealing member is selected from the group consisting of natural and synthetic rubbers.

8. The port door assembly of claim 1, further comprising a switch that controls when said electromagnet is electrically connected to a power source and energized.

9. The port door assembly of claim 8, wherein said switch is a soft button on a touch-screen display.

10. The port door assembly of claim 8, wherein said switch may be remotely and wirelessly activated.

11. The port door assembly of claim 1, said latching assembly further comprising a magnetic flux sensor coupled to a sensor circuit, wherein said sensor circuit outputs a first control signal when said door is closed and said ferromagnetic member is adjacent to said latching assembly, and wherein said sensor circuit outputs a second control signal when said door is open and said ferromagnetic member is not adjacent to said latching assembly.

12. The port door assembly of claim 11, wherein said magnetic flux sensor is mounted within a ferromagnetic core of said electromagnet.

13. The port door assembly of claim 11, wherein said magnetic flux sensor is comprised of a reed switch.

14. The port door assembly of claim 11, wherein said magnetic flux sensor is comprised of a Hall sensor.

15. The port door assembly of claim 11, further comprising a system controller coupled to said sensor circuit, wherein said system controller performs a preset response upon receipt of said second control signal.

16. The port door assembly of claim 15, further comprising a warning indicator, wherein said preset response comprises activating said warning indicator.

17. The port door assembly of claim 15, further comprising a vehicle port light, wherein said preset response comprises activating said vehicle port light.

18. The port door assembly of claim 15, further comprising a notification subsystem coupled to said system controller, wherein said preset response comprises transmitting a notification message via said notification subsystem.

19. The port door assembly of claim 1, wherein said vehicle is an electric vehicle and said vehicle port door comprises a charge port for a charge port of the electric vehicle, the port door assembly further comprising:
a spring configured to force the charge port door into the open position upon release by the latching assembly;
wherein an outer edge of the charge port, and the exterior surface of the latching assembly, are substantially flush with an externally facing surface of the port door assembly.

20. The port door assembly of claim 19, wherein when the charge port door is in the closed position the charge port door is flush with a surrounding vehicle surface that is parallel with the externally facing surface of the port door assembly.

* * * * *